(12) United States Patent
Shahpar

(10) Patent No.: US 12,098,651 B2
(45) Date of Patent: Sep. 24, 2024

(54) AEROFOIL SHAPING METHOD

(71) Applicant: ROLLS-ROYCE plc, London (GB)

(72) Inventor: Shahrokh Shahpar, Derby (GB)

(73) Assignee: Rolls-Royce PLC, London (GB)

( * ) Notice: Subject to any disclaimer, the term of this patent is extended or adjusted under 35 U.S.C. 154(b) by 110 days.

(21) Appl. No.: 17/847,699

(22) Filed: Jun. 23, 2022

(65) Prior Publication Data
US 2023/0024238 A1    Jan. 26, 2023

(30) Foreign Application Priority Data

Jul. 21, 2021    (GB) ...................................... 2110465

(51) Int. Cl.
F01D 5/14    (2006.01)

(52) U.S. Cl.
CPC .......... F01D 5/145 (2013.01); *F05D 2230/10* (2013.01); *F05D 2240/305* (2013.01); *F05D 2240/306* (2013.01)

(58) Field of Classification Search
CPC ................................. F01D 5/141; F01D 5/145
See application file for complete search history.

(56) References Cited

U.S. PATENT DOCUMENTS

| | | | | |
|---|---|---|---|---|
| 8,701,287 B2 * | 4/2014 | Holze | ...................... | B24B 19/14 29/889.23 |
| 10,002,209 B2 * | 6/2018 | Cellier | ...................... | G06F 30/00 |
| 2006/0275134 A1 | 12/2006 | Hasenjager et al. | | |
| 2012/0047735 A1 | 3/2012 | Czerner | | |
| 2017/0226860 A1 | 8/2017 | Aschermann et al. | | |
| 2017/0252896 A1 | 9/2017 | Gascher et al. | | |
| 2017/0292528 A1 | 10/2017 | Brown et al. | | |

FOREIGN PATENT DOCUMENTS

| | | | |
|---|---|---|---|
| DE | 10254823 A1 | 7/2003 | |
| DE | 102011102286 A1 * | 11/2012 | ............. F01D 5/141 |
| EP | 2106876 A1 | 10/2009 | |
| EP | 2918777 A1 | 9/2015 | |
| EP | 3202529 A1 | 8/2017 | |
| EP | 3480426 A1 | 5/2019 | |
| EP | 3613995 A1 | 2/2020 | |
| WO | 2012028267 A1 | 3/2012 | |

OTHER PUBLICATIONS

European Search Report dated Nov. 30, 2022, issued in EP Patent Application No. 22180114.5.
Great Britain search report dated Jan. 12, 2022, issued in GB Patent Application No. 2110465.8.

* cited by examiner

*Primary Examiner* — Sabbir Hasan

(57) ABSTRACT

A method for shaping an aerofoil by: (a) defining an aerofoil having a nominal shape, the nominal shape defined by; a leading edge, a trailing edge, a root and a tip, a span extending from the root to the tip, a pressure surface and a suction surface extending from the leading edge to the trailing edge; a nominal camber line extending from the leading edge to the trailing edge; (b) defining an edge region on one of the pressure and/or suction surface which extends distance of at least 0.1% but no more than 10% of the camber line length from one of the leading edge or the trailing edge of the aerofoil; and (c) adapting the shape of the pressure and/or suction surface within the edge region such that the edge region of the aerofoil achieves an asymmetric profile with respect to the nominal camber line.

19 Claims, 14 Drawing Sheets

AEROFOIL SHAPING METHOD

CROSS-REFERENCE TO RELATED APPLICATIONS

This specification is based upon and claims the benefit of priority from United Kingdom patent application GB 2110465.8 filed on Jul. 21, 2021, the entire contents of which is incorporated herein by reference.

BACKGROUND

Technical Field

The present disclosure relates to aerofoils used in engines, and particularly to a method of shaping aerofoils suitable for use in gas turbine or electric engines.

Description of the Related Art

A significant part of airline operational cost is fuel; hence significant effort has been made to increase the energy efficiency of gas turbine engines. Similarly, as electric engines become more prevalent, they too will need to be as energy-efficient as possible. A major factor in the efficiency of an engine is the design of the aerofoils used in the various parts of the engine, such as the fan blades, compressor blades and turbine blades. Typically, the fan blades in front of the engine are responsible for both producing the majority of the thrust (in the bypass duct of gas turbine engines) as well as the expected level of engine efficiency. For example, for gas turbine engines, the fan is quoted to contribute to 60-70% of the overall engine efficiency, e.g. a 1% of fan efficiency translates to 0.6-0.7% of the engine's specific fuel consumption. It is therefore clearly important that, for example, the fan blades of an engine's fan are designed to be as efficient as possible. Whilst the contribution to the overall engine efficiency of the turbine and compressor blades is not currently as great as that of the fan, it is obviously still desirable that each component operates as efficiently as possible.

One of the major factors determining the efficiency of an aerofoil is its shape, in particular the shapes of the leading edge and trailing edge of the aerofoil. The leading edge of the aerofoil is the part of the aerofoil that, when in use, airflow comes into contact with first, and having then passed over the aerofoil, the trailing edge is the last part of the aerofoil the airflow is in contact with. Early aerofoils were designed with circular leading-edges because of simplicity in manufacturing; however, these suffer from what is known as the "leading-edge separation bubble". At transonic and supersonic flow regimes the sudden curvature variation on a circular leading edge to the flat suction and pressure sides of the aerofoils can cause a large Mach number "spike" at the leading-edge, which can lead to thickening of the boundary-layer and an increase in entropy. A typical fan blade could suffer a decrease in efficiency as great as 1% due to these spikes. To mitigate this problem, elliptic leading-edges have been used. The so-called leading edge Mach number spike is reduced significantly using elliptic leading-edges. The shape of the trailing edge has been shown to have a similar effect on the performance of the aerofoil.

However, it has been noted that whilst aerofoils are designed to have certain geometrical features in order to improve their performance, due to manufacturing tolerances during construction, and wear and tear on the aerofoil during use, the actual performance efficiency of the aerofoils is less than it theoretically should be. There is therefore a need for a design of aerofoil which retains a high level of efficiency even when taking into account real-life variations in geometry, e.g. due to manufacturing tolerances; a method for making such an aerofoil; and a method of adapting an existing aerofoil to improve its performance.

SUMMARY

According to a first aspect there is provided a method for shaping an aerofoil, the method comprising the steps of: (a) manufacturing an aerofoil having a nominal shape, the nominal shape defined by a leading edge, a trailing edge, a root and a tip, a span extending from the root to the tip, a pressure surface and a suction surface extending from the leading edge to the trailing edge, the pressure surface and the suction surface being on opposite faces of the aerofoil and extending from the root to the tip of the aerofoil, the aerofoil having a nominal camber line extending from the leading edge to the training edge passing through a locus of points equidistant between the pressure and suction surfaces; (b) defining an edge region on one of the pressure and/or suction surface which extends distance of at least 0.1% but no more than 10% of the camber line length from one of the leading edge or the trailing edge of the aerofoil; and (c) altering the shape of the pressure and/or suction surface within the edge region such that the edge region of the aerofoil achieves an asymmetric profile with respect to the nominal camber line.

Aerofoils shaped according to these criteria have been found to exhibit improved efficiency even after variations in shape due to manufacturing tolerances have been taken into account.

The method can further comprise defining a plurality of span sections along the span, and for each span section, defining an optimum camber line for the aerofoil; then, for each span section where the nominal camber line and optimal camber line are different, performing a manufacturing method to add or remove material from the pressure and/or suction surface within a region extending from one or both of the leading edge and trailing edge to a distance of at least 0.1% but no more than 10% of the nominal camber line from said leading edge or trailing edge, such that the resulting profile of the leading edge and/or trailing edge region for at least one span section is asymmetrical with respect to the nominal camber line and results in a shift from the nominal camber line to the optimum camber line.

Optionally, the defined optimum camber line can be different for each of the plurality of span sections.

Optionally, a first of the plurality of span sections and a second of the plurality of span sections can be on the leading edge of the aerofoil, such that the leading edge of the aerofoil comprises a first span section having a first magnitude of pressure side bias, and a second span section having a first magnitude of suction side bias.

Optionally, a third of the plurality of span sections and a fourth of the plurality of span sections can be on the trailing edge of the aerofoil, such that the trailing edge of the aerofoil comprises a third span section having a second magnitude of pressure side bias, and a fourth span section having a second magnitude of suction side bias.

Optionally, material may be added or removed only from the pressure surface, only from the suction surface, only in the leading edge region, or only in the trailing edge region.

Optionally, the profile of the pressure surface and/or suction surface of the leading and/or trailing edge region can be defined using a cubic B-spline and at least 4 control points.

Optionally, after the shape of the aerofoil has been altered, the profile of the pressure surface of the leading edge region can be defined using an ellipse with a first eccentricity, and the profile of the suction surface of the leading edge region can be defined using an ellipse with a second eccentricity, with the first and second eccentricities not being equal.

Optionally, after the shape of the aerofoil has been altered, the profile of the pressure surface of the trailing edge region can be defined using an ellipse with a third eccentricity, and the profile of the suction surface of the trailing edge region can be defined using an ellipse with a fourth eccentricity, with the third and fourth eccentricities not being equal.

Optionally, the resultant shape of the trailing edge region or leading edge region of a span section after the addition or removal of material can be defined as an asymmetric cubic curve or an asymmetrical ellipse.

The aerofoil can be a fan blade, a compressor blade, or a turbine blade of a gas turbine engine or an electric engine.

According to a second aspect there is provided a fan, a compressor or a turbine for an engine, the fan, the compressor or the turbine including at least one aerofoil shaped using the method of the first aspect.

According to a third aspect there is provided a gas turbine engine or an electric aircraft engine that includes a fan, a compressor or a turbine according to the second aspect. Engines built with such a fan, a compressor or a turbine have improved performance over engines having fans, compressors or turbines that have conventionally shaped aerofoils.

According to a fourth aspect there is provided an aircraft that includes at least one gas turbine engine or at least one electric aircraft engine according to the third aspect.

As noted above, the present disclosure may relate to a blade within a gas turbine engine. Such a gas turbine engine may comprise an engine core comprising a turbine, a combustor, a compressor, and a core shaft connecting the turbine to the compressor. Such a gas turbine engine will comprise a fan having fan blades located upstream of the engine core.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

It will be appreciated by the skilled person that the embodiments described herein are equally applicable to both a gas turbine engine and an electric engine.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
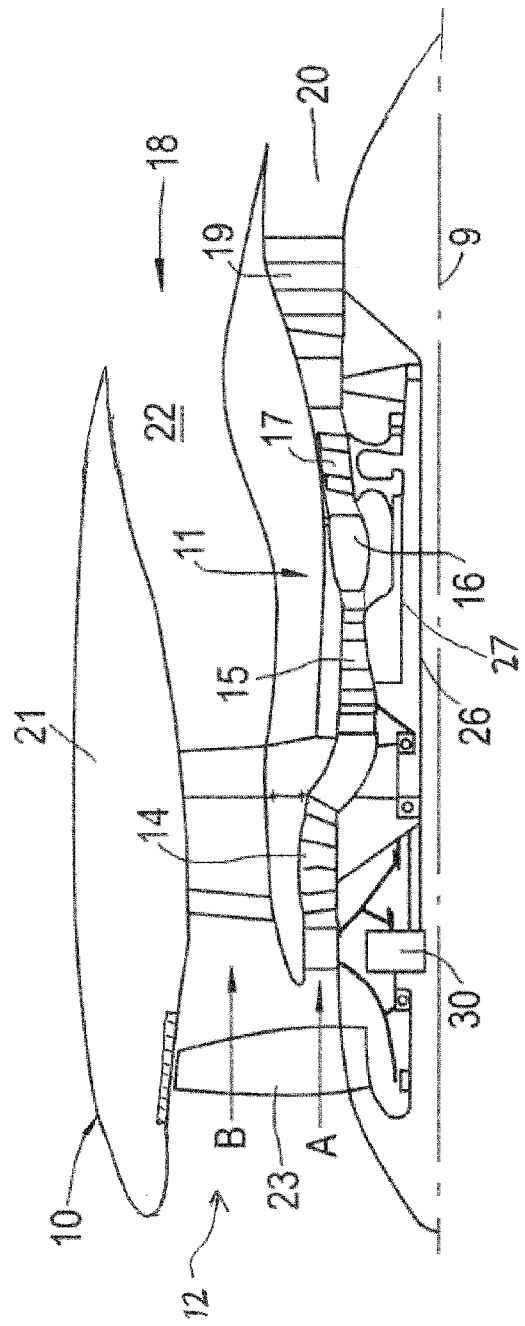
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 2:
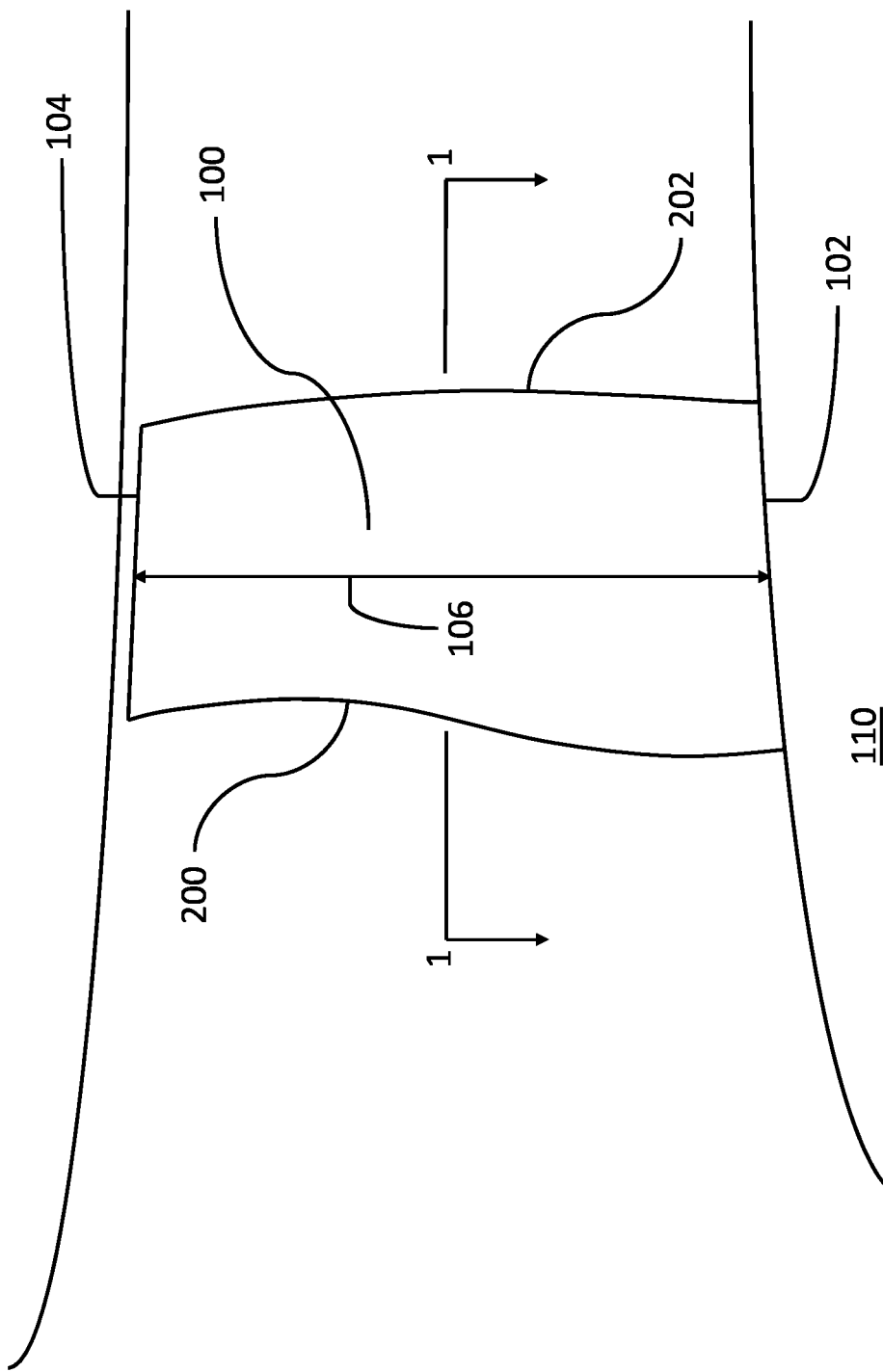
FIG. 2 is a schematic side view of an example aerofoil.

FIG. 2 shows a schematic side view of an example aerofoil 100, in this case a fan blade. The fan blade has a leading edge 200, which in use is the first part of the aerofoil to come into contact with the airflow passing around the aerofoil, and a trailing edge 202, which is the last part of the aerofoil to come into contact with the airflow passing around the aerofoil when in use. The aerofoil also has a span 106, which extends from the root 102 where the aerofoil is fixable to the hub 110 of the fan in this example, to a tip 104 which is the edge of the aerofoil opposite the root. In use, the tip of the aerofoil is positioned radially outermost from the axis of rotation of the rotative (be it fan, compressor, or turbine) the aerofoil is mounted to. The line 1-1 shows the direction of view for a sectional view of the aerofoil, such as that shown in FIG. 5.

Figure 3:
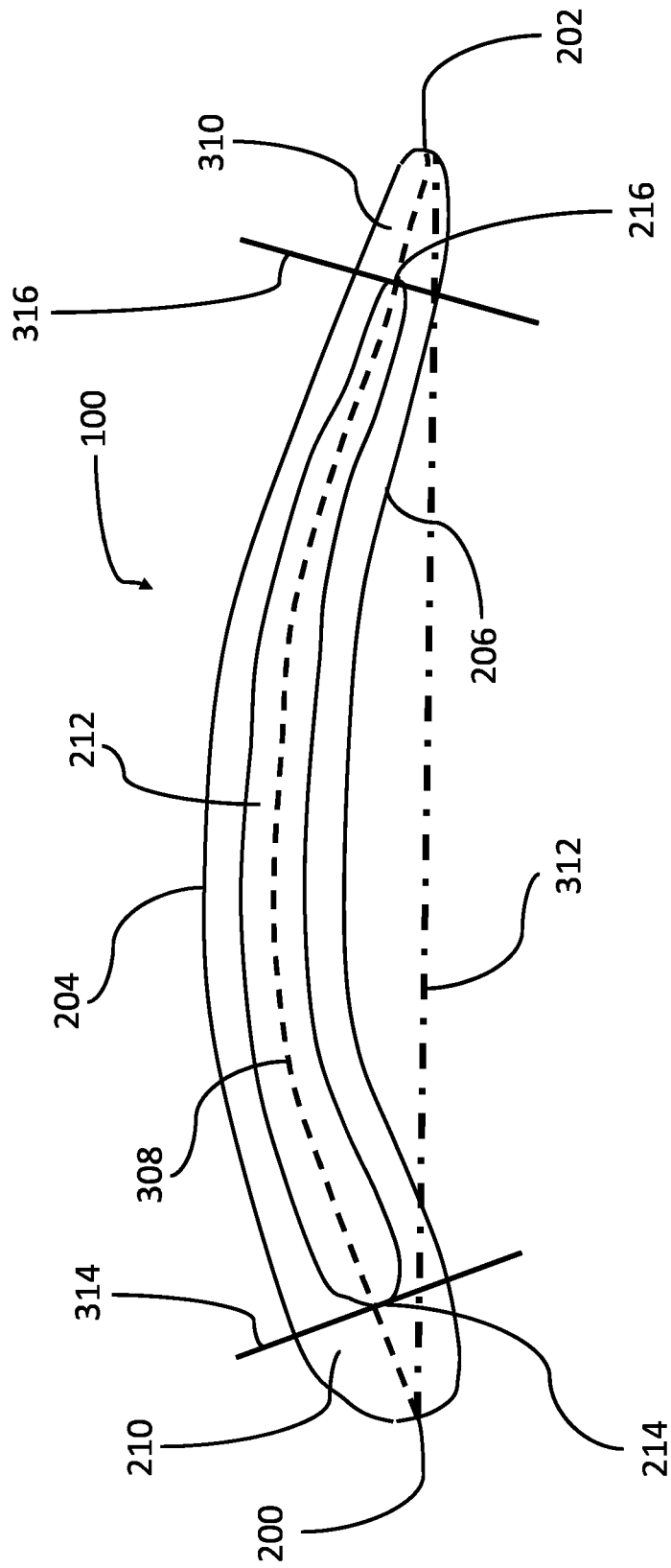
FIG. 3 shows a sectional view of a known aerofoil at one point along the span of the aerofoil.

FIG. 3 shows a sectional view of a known aerofoil at one point along the span of the aerofoil. The aerofoil has a nominal surface shape defined by the suction surface 204 and pressure surface 206 which extend between the leading edge 200 and trailing edge 202 of the aerofoil 100. The aerofoil has a nominal camber line 308, which for the purpose of this disclosure is defined using the loci of a series of points equidistant between the pressure 206 and suction 204 surfaces. Each span section of the aerofoil has a chord line 312 which extends in a straight line from the leading edge to the trailing edge of the aerofoil. The aerofoil has a leading edge region 210 and a trailing edge region 310. The leading edge region is the part of the aerofoil extending from the leading edge to the beginning of the hollow section 212 of the aerofoil measured along the nominal camber line 308, and bounded on the surface of the aerofoil by a leading edge boundary line 314 running perpendicular to the nominal camber line 308 at the point where the nominal camber line 308 intersects the forward opening point 214 of the hollow interior 212 of the aerofoil 100. The length of the leading edge region will vary depending on the design of the aerofoil, in particular the position of the hollow section 212 within the aerofoil. In some cases the leading edge region can extend up to as much as 10% of the length of the camber line. In other cases the leading edge region may extend along as little as 0.1% of the length of the camber line. The trailing edge region 310 is the part of the aerofoil 100 extending from the trailing edge 202 to the end of the hollow section 212 of the aerofoil measured along the nominal camber line 308, and bounded on the surface of the aerofoil by a trailing edge boundary line 316 running perpendicular to the nominal camber line 308 at the point where the nominal camber line 308 intersects the rearward closing point 216 of the hollow interior 212 of the aerofoil 100. The length of the trailing edge region will vary depending on the design of the aerofoil, in particular the position of the hollow section 212 within the aerofoil. In some cases the trailing edge region 310 can extend up to as much as 10% of the length of the nominal camber line 308. In other cases the trailing edge region may extend along as little as 0.1% of the length of the nominal camber line 308.

The method of the disclosure involves altering at least a section of either or both of the suction 204 and pressure 206 surfaces within either or both of the leading 210 and trailing 310 edge regions of the aerofoil in at least one span section of the aerofoil so as to create an asymmetric leading and/or trailing edge shape for that span section of the aerofoil. The asymmetric shape will alter the camber line from the nominal camber line 308 to an optimum camber line 309 within the leading and/or trailing edge region where the machining process is applied.

Figure 4:
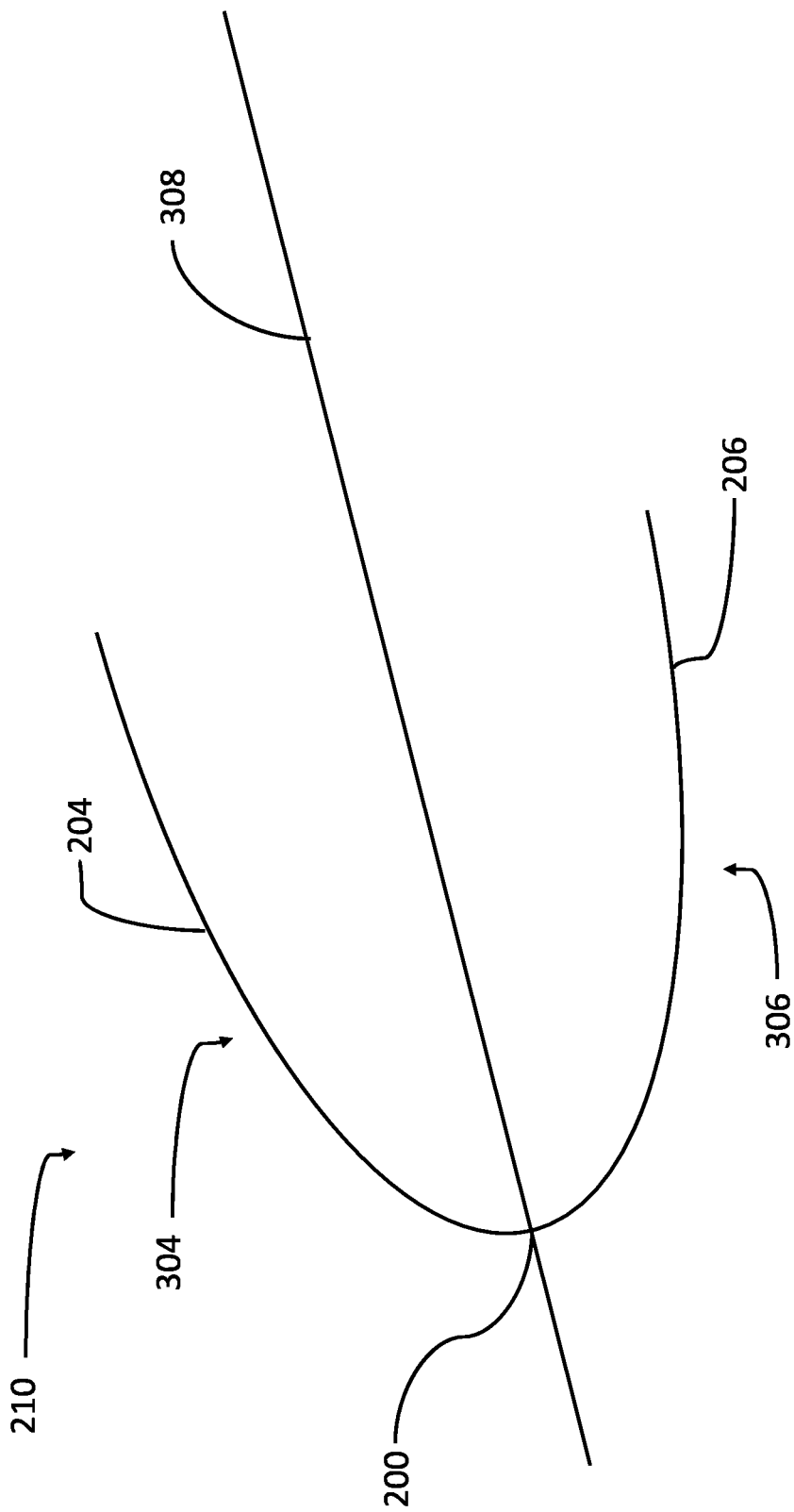
FIG. 4 shows the leading edge region of a known aerofoil.

FIG. 4 shows the leading edge region 210 of a known aerofoil, such an aerofoil having a nominal shape, with a pressure surface profile 306 and suction surface profile 304. The nominal camber line 308 extends from the leading edge 200 of the aerofoil along the aerofoil equidistant from the suction 204 and pressure 206 surfaces. The pressure surface profile and suction surface profile are symmetric about the nominal camber line 308 so as to create a symmetrical leading edge region 210 with respect to the nominal camber line 308, as is known in the art.

Figure 5:
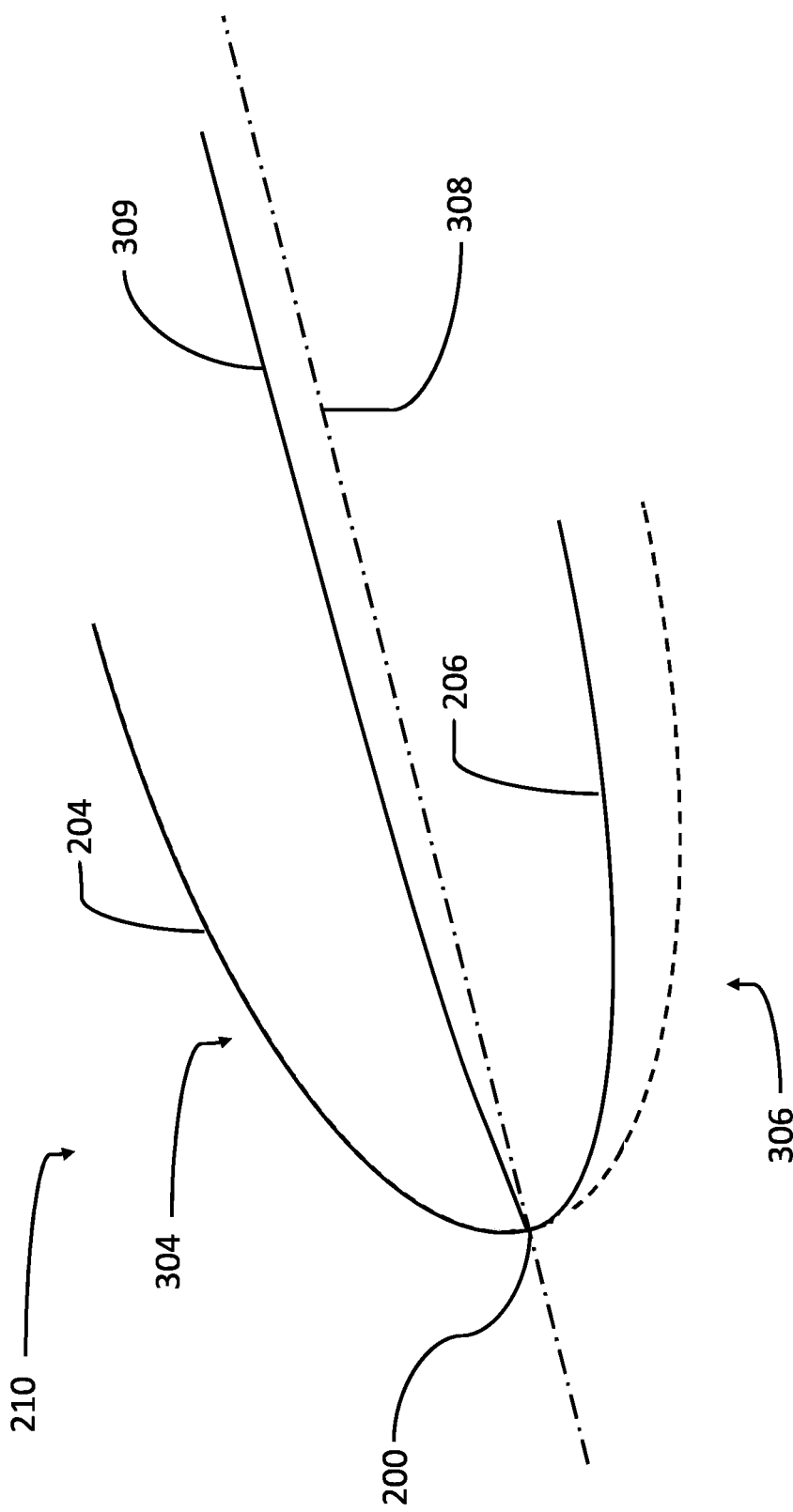
FIG. 5 shows the leading edge region of an aerofoil adapted according to an embodiment of the present disclosure.

FIG. 5 shows the leading edge region 210 after step c) of the method of the present disclosure is performed on the leading edge region of the known aerofoil of FIG. 4. In this case, the pressure surface profile 306 of the aerofoil 100 has been altered, with material being removed so as to decrease the distance between the pressure surface 206 and the nominal camber line 308 (now shown as a dot-dash line) in the leading edge region 210, creating an asymmetric leading edge region with respect to the nominal camber line 308, which shall be termed as a leading edge pressure side bias. As a result of the machining process, a new, optimum camber line 308 has been created.

Figure 6:
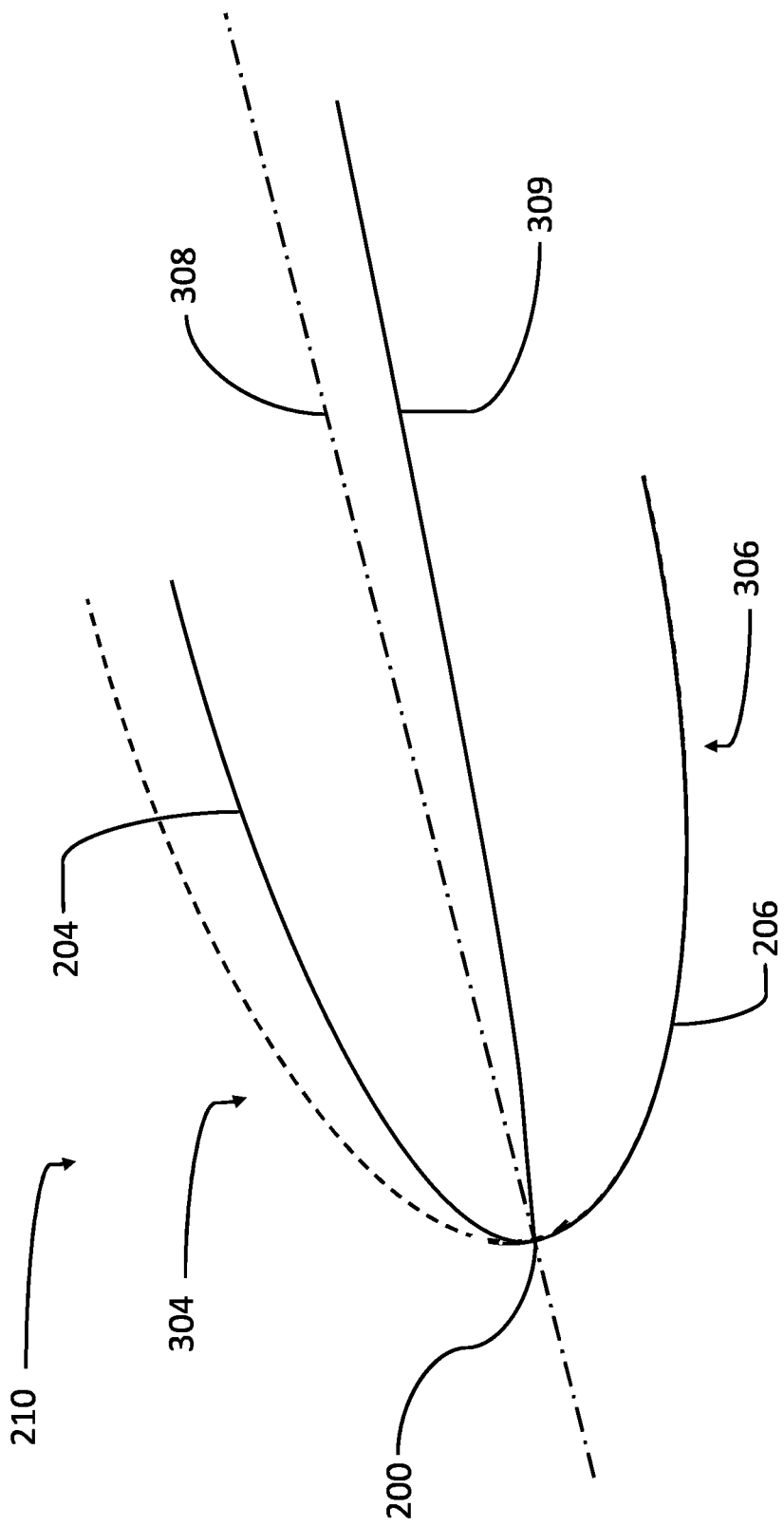
FIG. 6 shows the leading edge region of an aerofoil adapted according to an alternative embodiment of the present disclosure.

FIG. 6 shows the leading edge region of an aerofoil having undergone an equivalent process to that of FIG. 5, but for the suction surface profile 304, whereby the shape of the suction surface 204 has been altered by removing material, the effect of which is to move the camber line from a nominal position 308 (dash-dot line) to a new optimum position 309 (solid line) and create a leading edge suction side bias. It can be seen that the leading edge region 210 is now asymmetric with respect to the nominal camber line 308.

Figure 7:
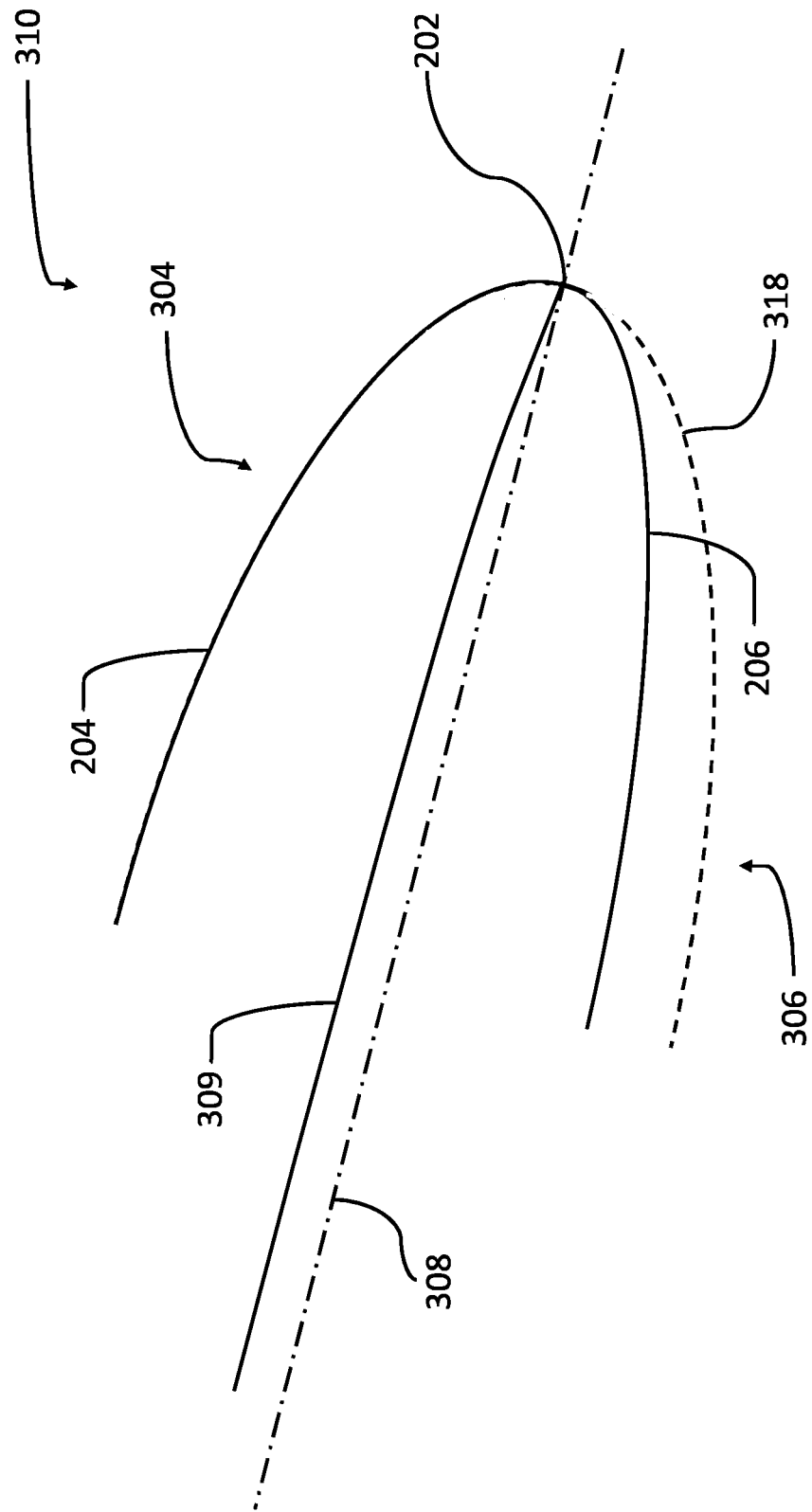
FIG. 7 shows the trailing edge region of an aerofoil adapted according to a further alternative embodiment of the present disclosure.

It will be understood that the same principles can be applied to the trailing edge region 310 of the aerofoil as shown in FIG. 7. In FIG. 7, starting from a trailing edge region which had a symmetrical profile (comprising the suction surface 204 and original pressure surface 318 (dashed line)) in relation to the nominal camber line 308, the original pressure surface 318 has been altered in the trailing edge region 310, so as to form a new pressure surface 206, and create a trailing edge pressure side bias. Consequently, the trailing edge region 310 of the aerofoil 100 now has an asymmetric profile in relation to the nominal camber line 308 (dash-dot line), and a new, optimal camber line 309.

Figure 8:
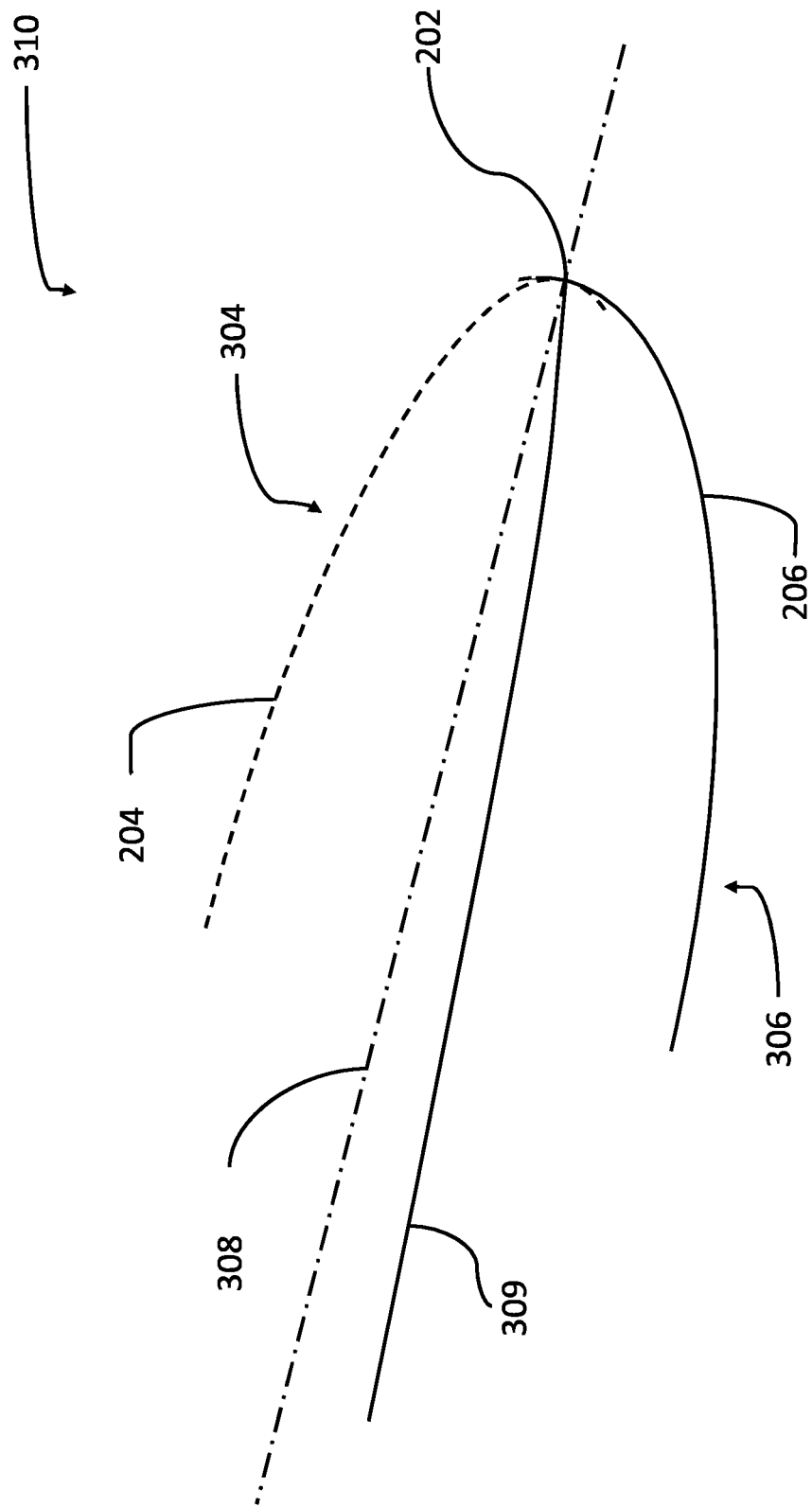
FIG. 8 shows the trailing edge region of an aerofoil adapted according to a further alternative embodiment of the present disclosure.

FIG. 8 shows an equivalent result when the machining method of the present disclosure is applied to the suction surface profile 302 of the trailing edge region 310. In this case the suction surface 204 has been altered by removing material from a nominal symmetrical aerofoil shape to create a new aerofoil shape which has an asymmetric trailing edge in relation to the nominal camber line (dash-dot line), herein referred to as a trailing edge suction side bias.

FIGS. 5 to 8 give examples of how the shape of an aerofoil can be adapted in the leading edge region 210 and/or trailing edge region 310 any point on the span of the aerofoil to create a suction side bias or a pressure side bias. It will be understood that at different span sections along the span of the aerofoil, it may be preferable to create different biases, or the same bias but to different degrees.

Figure 9:
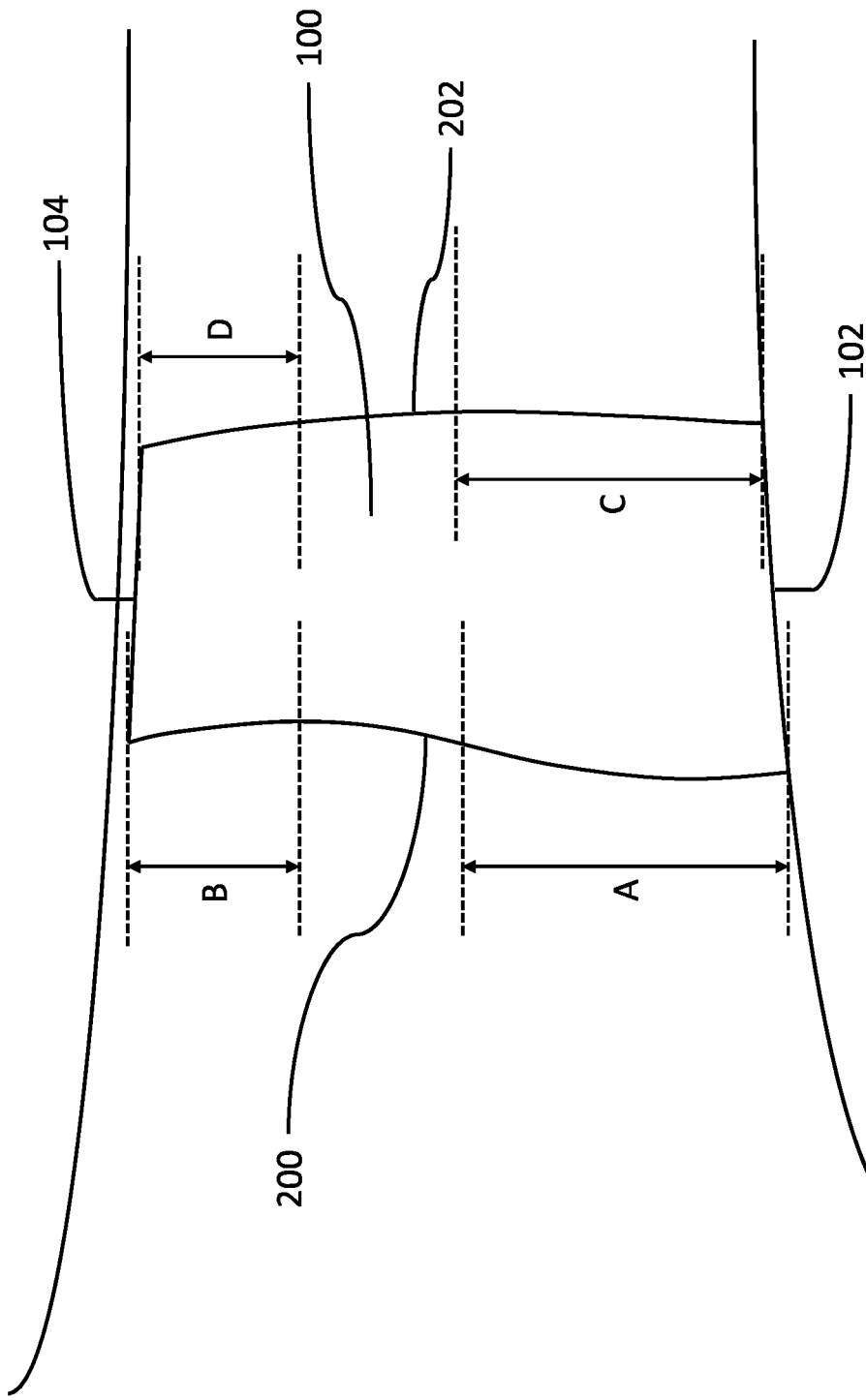
FIG. 9 shows a schematic side view of an aerofoil according to a further alternative embodiment of the present disclosure.

FIG. 9 shows a side view of an aerofoil, in this case a fan blade of an aeroplane engine. The leading edge of the aerofoil has two regions marked upon it covering two different span ranges. Span range A extends from the root 102 of the fan blade to around the mid-point of the leading edge, and span range B extends from around 70% to 100% (i.e. the tip of the blade) of the leading edge 200 of the blade. On the trailing edge 202, span range C extends from the root of the fan blade to around the mid-point of the trailing edge, and span range B extends from around 70% to 100% (i.e. the tip of the blade) of the leading edge of the blade. In one possible configuration, span range A may be shaped so as to have a first type of bias, for example a first magnitude of pressure side bias, and span range B may be shaped so as to have a second type of bias, for example a second magnitude of pressure side bias. In an alternative example, span range A may be shaped so as to have a first magnitude of pressure side bias, and span range B be shaped so as to have a first magnitude of suction side bias.

Such variations may alternatively or additionally be present on the trailing edge 202 of the aerofoil 100. For example, span range C of the blade of FIG. 12 may exhibit a first type of bias, for example a first magnitude of pressure side bias, and span range D may be shaped so as to have a second type of bias, for example a second magnitude of pressure side bias. In an alternative example, span range C may be shaped so as to have a first magnitude of pressure side bias, and span range D be shaped so as to have a first magnitude of suction side bias. In this way, it is possible for the leading edge and/or the trailing edge of the aerofoil to have a first span range having a first magnitude of pressure side bias, and a second span having a first magnitude of suction side bias. Such a configuration can be thought of as "flipping" the bias on the leading edge and/or the trailing edge, as further described below.

Figure 10:
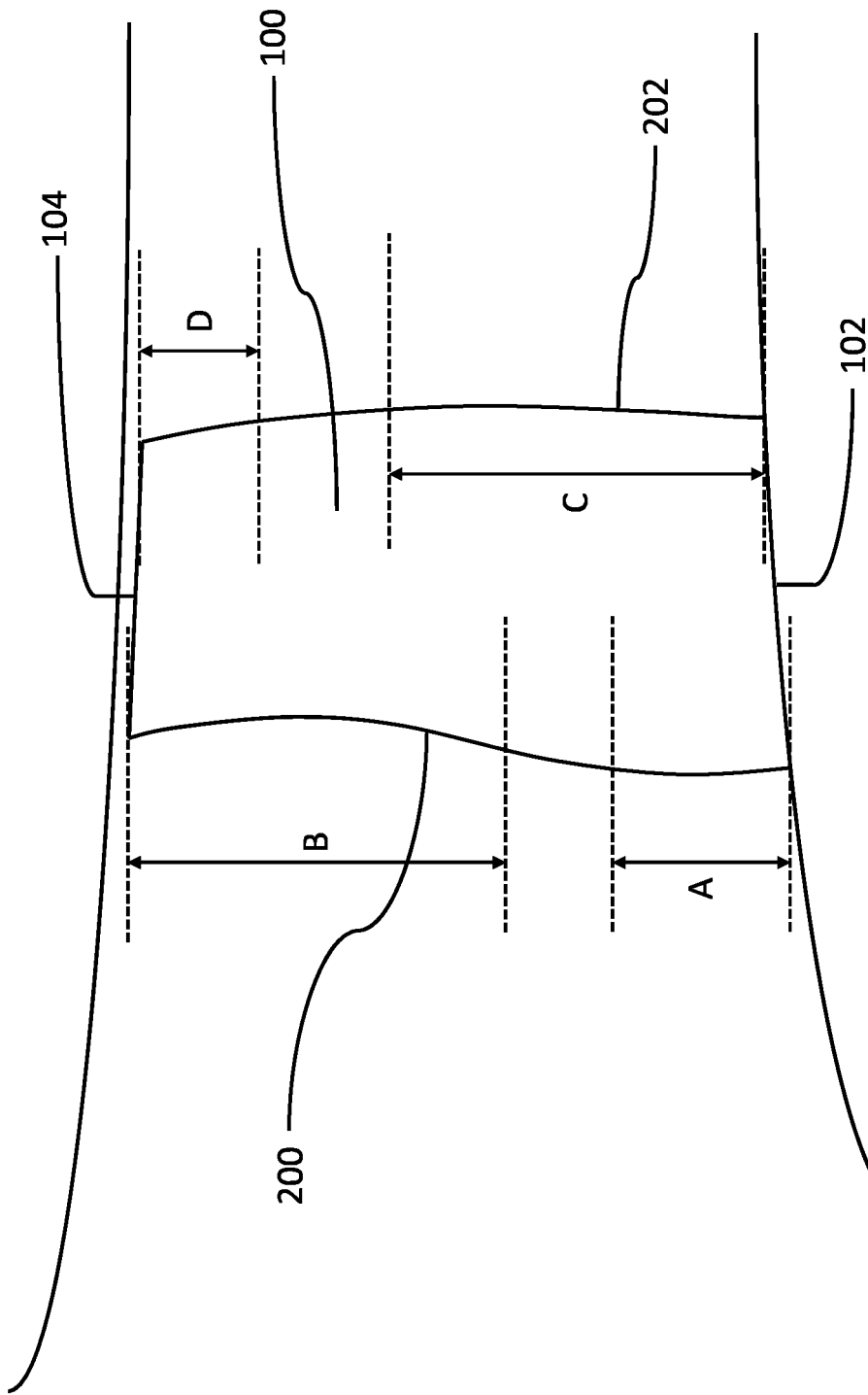
FIG. 10 shows a schematic side view of an aerofoil according to a further alternative embodiment of the present disclosure.

FIG. 10 shows further variations that can be accomplished using the method of the disclosure. Whereas the span regions of the trailing edge 202 in FIG. 9 largely mirrored those of the leading edge 200, in FIG. 10 the span regions are different. Specifically, in FIG. 10 the first span region A on the leading edge of the blade which might be machined to exhibit a first type of bias only extends ~30% of the way from the root towards the tip of the blade, whereas the second span region B on the leading edge extends from ~55% up to 100% (the tip) of the leading edge of the blade. On the trailing edge, the span region C extends from the root up to about 60% of the span of the blade, whereas the span region D only extends from about 80% to the tip of the blade at the trailing edge. As described previously, each span region may have an asymmetric shape so as to be biased to either the pressure or suction side, and may have a different degree of biasing to each other.

Figure 11:
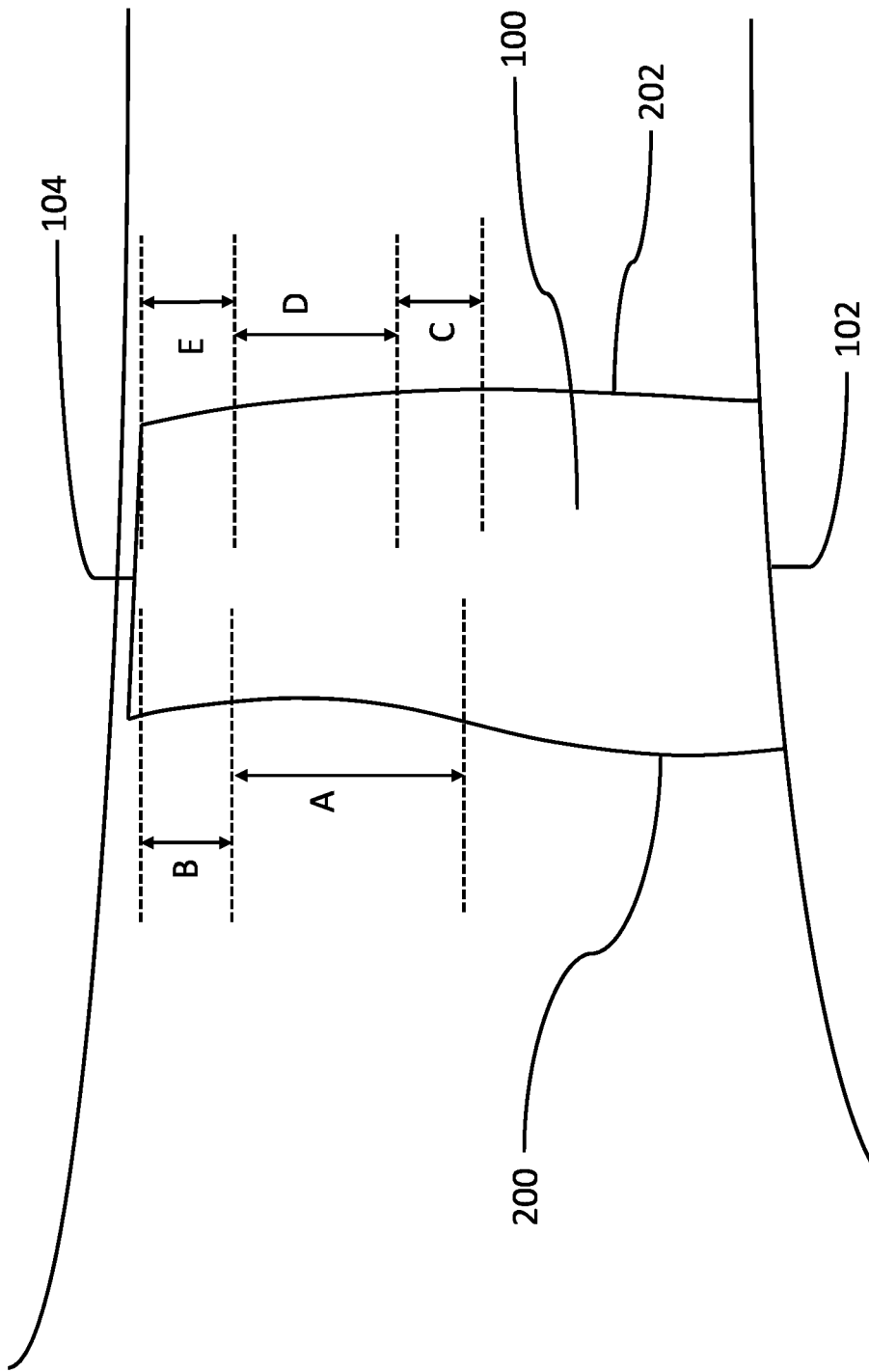
FIG. 11 shows a schematic side view of an aerofoil according to a further alternative embodiment of the present disclosure.

The inventor has found that biasing the leading and trailing edges of the aerofoil tends to have a greater effect in the radially outermost region of the aerofoil, i.e. in the region between 50% and 100% of the span of the aerofoil. FIG. 11 shows an example where the leading edge of a fan blade has a first span region A with a first leading edge bias extending from ~50% of the span to ~80% of the span, and then a second span region B with a second, different bias extending from ~80% of the span to ~98% of the span.

It will be appreciated that either or both of the leading 200 or trailing 202 edges of the blade can have any number of span regions with each exhibiting a different bias. On the trailing edge 202 of FIG. 11, three span regions, C, D, and E are shown, extending from ~45% to ~60%, ~60% to ~85%, and ~85% to 100% respectively. Each of these biases may be to the pressure side or suction side to varying degrees.

A particularly advantageous configuration is to have the bias "flip" in the radially outermost 50% of the aerofoil, such that the bias of the asymmetric profile changes with respect to the nominal camber line. Using FIG. 11 as an example, the first 50% of the aerofoil span (i.e. from 0% at the root 102 to 50% of the way towards the tip 104) may first be formed so as to have a symmetrical leading edge shape as known in the prior art. Span A may then be shaped i.e. altered so that the leading edge region 210 exhibits an asymmetry towards the pressure side (i.e. a pressure side bias as shown in FIG. 5) with respect to the nominal camber line, and span B may be shaped so that the leading edge region 210 exhibits an asymmetry towards the suction side (i.e. a suction side bias as shown in FIG. 6) with respect to the nominal camber line. Such a configuration when used in blades on a fan has been found to improve the performance of the fan overall.

Figure 12:
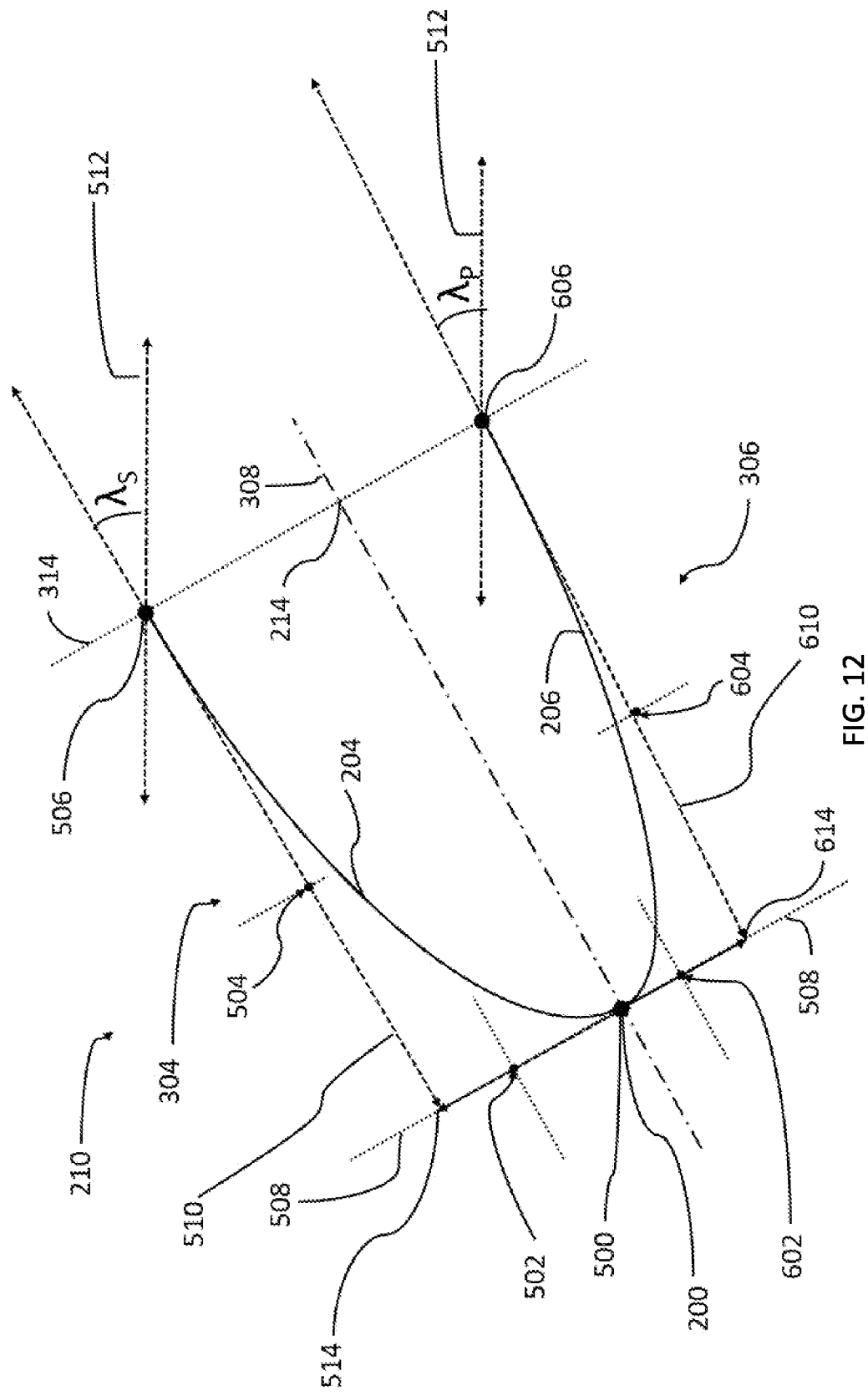
FIG. 12 shows a leading edge region of a span section of an aerofoil according to a further alternative embodiment of the disclosure.

FIG. 12 shows a leading edge region 210 of a span section of an aerofoil 100 according to a further embodiment of the disclosure. The leading edge region has a pressure side bias, formed by altering the shaping of material on the pressure surface 206 within the leading edge region. In this example, the curvatures of the pressure surface profile 306 and the suction surface profile 304 are determined using cubic B-splines with at least four control points. In the example of FIG. 12, there are four control points determining the profile of each of the pressure 306 and suction 304 surface profiles. The first control point 500 is shared by both the pressure and suction surface profiles, and is located where the nominal camber line 308 meets the leading edge 200 of the aerofoil, i.e. the point on the aerofoil which first comes into contact with airflow during use. The fourth control point 606 for the pressure surface 206 is the point on the pressure surface where the leading edge region 210 ends, i.e. where the hollow part of the aerofoil begins 214. As described above, the minimum distance this point can be from the leading edge is 0.1% of the length of the nominal camber line 308, and the maximum distance it can be is 10% of the length of the camber line. The fourth control point for the 506 for the suction surface 204 is the point on the suction surface where leading edge region 210 ends. As with the pressure surface, the minimum distance this point can be from the leading edge is 0.1% of the length of the nominal camber line 308, and the maximum distance it can be is 10% of the length of the camber line.

The first 500 and fourth 506, 606 control points define two corners of a triangle which is used to determine the shape of the curvature of the surface profile 304, 306. The first side of the triangle is formed by a first line 508 drawn tangentially to the leading edge 200 at the first control point 500. The second side of the triangle is formed by a second line 510, 610 drawn tangentially to the suction or pressure surface at the location of the fourth control point 506, 606 on that surface. The angle in the plane of the span section between the second line 510, 610 and a line 512 parallel to the principle rotational axis 9 of the engine is known as lambda. On the pressure surface 206 this angle is denoted as $\lambda_P$, and on the suction surface 204 this angle is denoted as $\lambda_S$.

The second control point 502, 602 is placed on the first line 508 between 40% and 100% of the distance between the first control point 500 and the point 514, 614 where the first line 508 and second line for the suction 510 or pressure 610 side intersect, where 0% is at the leading edge 200 and 100% is where the point 514, 614 where the first and second lines intersect. In the example shown in FIG. 12, the second control point 502 on the suction surface side is positioned at about 60% of the distance along the suction surface side of the first line 508, and the second control point 602 on the pressure surface side is positioned at about 45% of the distance along the pressure surface side of the first line 508. The third control point 504, 604 is placed on the second line 510, 610 between 40% and 100% of the distance between the point 514, 614 where the first 508 and second 510, 610 lines intersect, and the fourth control point 506, 606, where 0% is the point 514, 614 where the first and second lines intersect and 100% is at the fourth control point 506, 606. In the example of FIG. 12, the third control point 504 on the suction surface side is positioned at about 60% of the distance along the suction surface second line 510, and the third control point 604 on the pressure surface side is positioned at about 60% of the distance along the pressure surface second line 610.

Because the control points 500, 502, 504, 506 on the suction side are not all in the same location as the corresponding control points 500, 602, 604, 606 on the pressure side, the resulting leading edge region 210 is asymmetric with respect to the nominal camber line 308. In this case it is the positions of the suction surface second control point 502 and the pressure surface second control point 602 that are different, but it will be clear to the skilled person that it can be either or both of the second 502, 602 or third 504, 604 control points that are different between the suction 204 and pressure surfaces 206, which in turn will lead to an asymmetric leading edge. Equally, more control points can be introduced within the leading edge region 210 and added to the cubic B-spline to create different asymmetric leading edge profiles.

The same conditions can be applied to the trailing edge region 310, which is to say the same system of control points and cubic B-splines can be used to determine the pressure 306 and suction surface 304 profiles in the trailing edge region 310 of the aerofoil 100. Equally, the values used can vary along the span of the blade, so that, as illustrated in FIGS. 9 to 11, different span ranges of the leading and/or trailing edge can have different asymmetries defined by using different positions for the control points on the pressure and suction surfaces.

By varying the position of the control points within these ranges, the degree of asymmetry of the aerofoil within the leading edge and/or trailing edge regions can vary between the root 102 and the tip 104 of the aerofoil 100.

The skilled reader will appreciate that such control points can be used to create pressure and suction surface shapes other than cubic B-splines. For example, the same control points could be used to create a hyperbola or polynomial curve to define a part of the pressure and/or suction surface of the leading and/or trailing edge region, providing the control points are within the same bounds as previously described, and the curves create an asymmetry in the leading and/or trailing edge region.

Figure 13:
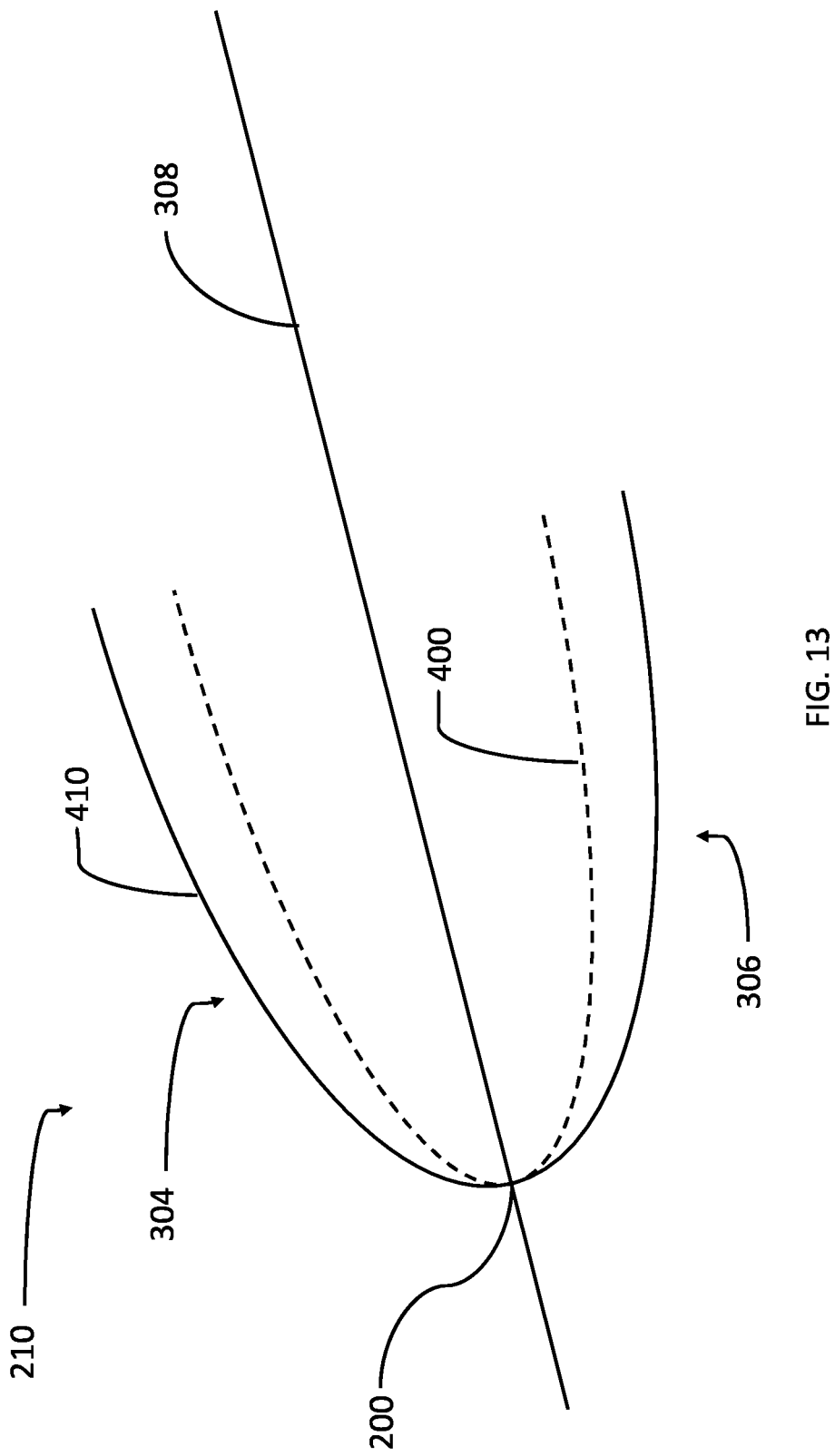
FIG. 13 shows a leading edge region of a span section of an aerofoil according to a further alternative embodiment of the disclosure.

In a further alternative embodiment of the present disclosure, the leading and/or trailing edge region of the aerofoil can be altered to achieve an edge region having a combination of partial ellipses having different eccentricities. In a known aerofoil design, the leading and/or trailing edge region of the aerofoil can have a shape comprising a semi-ellipse, such as that shown by either of the first elliptic leading edge profile 400 or second elliptic leading edge profile 410 in FIG. 13. A nominal camber line 308 is shown which divides the leading edge region 210 of the aerofoil into a pressure surface profile 306 and a suction surface profile 304. In each case, the eccentricity of the ellipse on the pressure surface matches the eccentricity of the ellipse of the suction surface, giving the leading edge region 210 of the aerofoil 100 a symmetric profile with respect to the nominal camber line 308. Using the method disclosed herein, one or other of the pressure 306 or suction 304 side surface can be altered to form a partial ellipse with a different eccentricity. If the eccentricity of the partial ellipse on the suction side is different to the eccentricity of the ellipse on the pressure side, the leading edge region will become asymmetric with respect to the nominal camber line. This can be envisaged in FIG. 13 by combining the suction or pressure surface of the first elliptic leading edge profile with the pressure or suction surface of the second elliptic leading edge profile, such that the profile is determined by a dashed line on one side of the nominal camber line 308 and a solid line of the other side of the nominal camber line 308 in FIG. 13. Whilst FIG. 13 shows this concept with respect to the leading edge region of an aerofoil, it will be clear to the skilled person that the same principles can be applied to the trailing edge region 310 of an aerofoil also.

Figure 14:
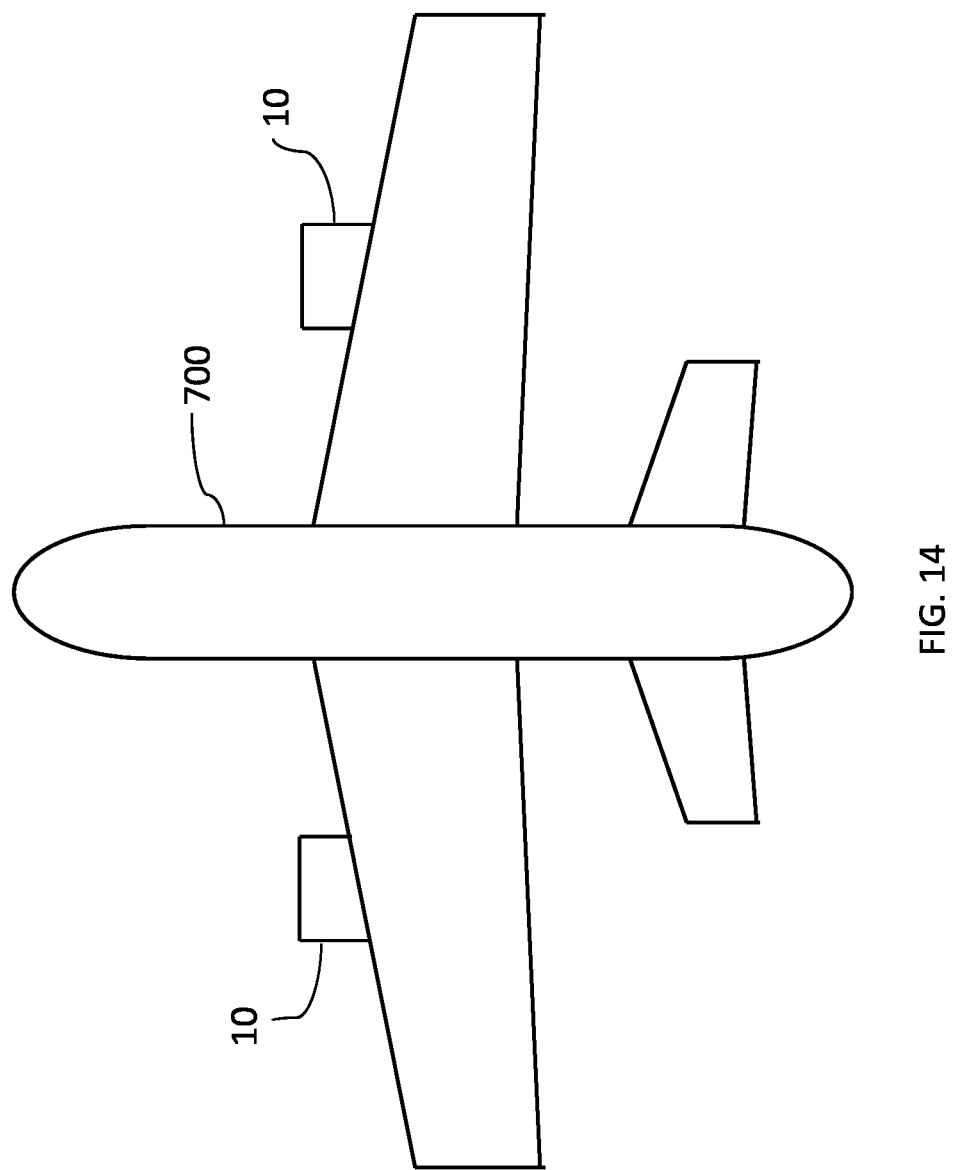
FIG. 14 illustrates an aeroplane comprising at least one engine according to the present disclosure.

FIG. 14 illustrates an aircraft, in this case an aeroplane (700) comprising two engines 10. Fitting one or both of the engines 10 with any or all of fans, compressors and turbines comprising aerofoils shaped according to the present disclosure can improve the performance of the fuel efficiency of the engine, thus reducing its environmental impact.

The skilled reader will appreciate that the shaping of the leading and/or trailing edges can be achieved in a number of ways. For example, an existing aerofoil with a symmetrical shape can be adapted by removing material, adding material, or both removing and adding material to the regions being reshaped. Alternatively a base aerofoil can be directly shaped via the addition or removal of material so as to achieve the desired asymmetry. In a further alternative, manufacturing techniques such as additive layer manufacturing could be used to directly build an aerofoil having the desired asymmetric leading and/or trailing edge region profile.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A method for shaping an aerofoil, the method comprising the steps of:
   (a) manufacturing an aerofoil having a nominal shape, the nominal shape defined by;
   a leading edge, a trailing edge, a root and a tip, a span extending from the root to the tip, a pressure surface and a suction surface extending from the leading edge to the trailing edge, the pressure surface and the suction surface being on opposite faces of the aerofoil and extending from the root to the tip of the aerofoil; and
   a nominal camber line extending from the leading edge to the trailing edge passing through a locus of points equidistant between the pressure and suction surfaces;
   (b) defining an edge region on one of the pressure and/or suction surface which extends a distance of at least 0.1% but no more than 10% of the nominal camber line length from one of the leading edge or the trailing edge of the aerofoil; and
   (c) altering the shape of the pressure and/or suction surface only within the edge region such that the edge region of the aerofoil achieves an asymmetric profile with respect to the nominal camber line.

2. The method of claim 1, further comprising defining a plurality of span sections along the span;
   for each span section, defining an optimum camber line for the aerofoil; and
   for each span section where the nominal camber line and optimal camber line are different, performing a manufacturing method to add or remove material from the pressure and/or suction surface within a region extending from one or both of the leading edge and trailing edge to a distance of at least 0.1% but no more than 10% of the nominal camber line from said leading edge or trailing edge;

wherein the resulting profile of the leading edge and/or trailing edge region for at least one span section is asymmetrical with respect to the nominal camber line and results in a shift from the nominal camber line to the optimum camber line.

3. The method of claim 2, wherein the defined optimum camber line is different for at least two of the plurality of span sections.

4. The method of claim 2, wherein a first of the plurality of span sections and a second of the plurality of span sections are on the leading edge of the aerofoil, such that the leading edge of the aerofoil comprises a first span section having a first magnitude of pressure side bias, and a second span section having a first magnitude of suction side bias.

5. The method of claim 3, wherein a first of the plurality of span sections and a second of the plurality of span sections are on the leading edge of the aerofoil, such that the leading edge of the aerofoil comprises a first span section having a first magnitude of pressure side bias, and a second span section having a first magnitude of suction side bias.

6. The method of claim 2, wherein a third of the plurality of span sections and a fourth of the plurality of span sections are on the trailing edge of the aerofoil, such that the trailing edge of the aerofoil comprises a third span section having a second magnitude of pressure side bias, and a fourth span section having a second magnitude of suction side bias.

7. The method of claim 3, wherein a third of the plurality of span sections and a fourth of the plurality of span sections are on the trailing edge of the aerofoil, such that the trailing edge of the aerofoil comprises a third span section having a second magnitude of pressure side bias, and a fourth span section having a second magnitude of suction side bias.

8. The method of claim 1, wherein material is added or removed only from the pressure surface.

9. The method of claim 1, wherein material is added or removed only from the suction surface.

10. The method of claim 1, wherein material is added or removed only in the leading edge region.

11. The method of claim 1, wherein material is added or removed only in the trailing edge region.

12. The method of claim 1, wherein the profile of the pressure surface and/or suction surface of the leading and/or trailing edge region is defined using a cubic B-spline and at least 4 control points.

13. The method of claim 1 wherein, after the shape of the aerofoil has been altered, the profile of the pressure surface of the leading edge region is defined using an ellipse with a first eccentricity, and the profile of the suction surface of the leading edge region is defined using an ellipse with a second eccentricity, and the first and second eccentricities are not equal.

14. The method of claim 1 wherein, after the shape of the aerofoil has been altered, the profile of the pressure surface of the trailing edge region is defined using an ellipse with a third eccentricity, and the profile of the suction surface of the trailing edge region is defined using an ellipse with a fourth eccentricity, and the third and fourth eccentricities are not equal.

15. The method of claim 1 wherein the resultant shape of the trailing edge region or leading edge region of a span section after the addition or removal of material is defined as an asymmetric cubic curve or an asymmetrical ellipse.

16. The method of claim 1 wherein the aerofoil is a fan blade, a compressor blade, or a turbine blade of a gas turbine engine.

17. The method of claim 1 wherein the aerofoil is a fan blade of an electric engine.

18. A fan, a compressor or a turbine for an engine, the fan, the compressor or the turbine including at least one aerofoil shaped using the method of claim 1.

19. A gas turbine engine that includes the fan, the compressor, or the turbine of claim 18.

* * * * *